US008773814B1

(12) United States Patent
Hendriks

(10) Patent No.: US 8,773,814 B1
(45) Date of Patent: Jul. 8, 2014

(54) HARD DISK HAVING A SQUEEZE AIR BEARING FOR ROTATING A DISK

(71) Applicant: HGST Netherlands B.V., Amsterdam (NL)

(72) Inventor: Ferdinand Hendriks, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/720,778

(22) Filed: Dec. 19, 2012

(51) Int. Cl.
*G11B 19/20* (2006.01)

(52) U.S. Cl.
USPC .................. 360/99.08; 360/97.11; 360/97.14

(58) Field of Classification Search
USPC ........... 360/97.11, 97.14, 99.08, 97.15, 98.07
See application file for complete search history.

(56) References Cited

U.S. PATENT DOCUMENTS

| 3,339,421 | A | | 9/1967 | Warnock, Jr. | |
|---|---|---|---|---|---|
| 3,351,393 | A | | 11/1967 | Emmerich | |
| 3,471,205 | A | | 10/1969 | Farron et al. | |
| 4,533,186 | A | | 8/1985 | Engwall et al. | |
| 4,666,315 | A | | 5/1987 | Scranton | |
| 6,078,468 | A | * | 6/2000 | Fiske | 360/97.11 |
| 6,894,866 | B2 | * | 5/2005 | Nishijima et al. | 360/99.18 |
| 6,900,567 | B2 | | 5/2005 | Aiello et al. | |
| 6,900,962 | B1 | * | 5/2005 | Forbord | 360/99.22 |
| 6,949,852 | B2 | | 9/2005 | Aiello | |
| 6,975,484 | B2 | | 12/2005 | Herndon et al. | |
| 7,088,019 | B2 | * | 8/2006 | Takada et al. | 310/40 MM |
| 7,820,601 | B2 | | 10/2010 | Karis et al. | |
| 7,911,734 | B2 | | 3/2011 | Wakatani et al. | |
| 8,157,447 | B2 | | 4/2012 | Aiello | |
| 2002/0048416 | A1 | * | 4/2002 | Binnig et al. | 384/12 |
| 2007/0098399 | A1 | * | 5/2007 | Yasunaga | 396/508 |
| 2007/0217064 | A1 | * | 9/2007 | Wakitani et al. | 360/99.08 |
| 2010/0242262 | A1 | | 9/2010 | Nguyen et al. | |

OTHER PUBLICATIONS

E. O. J. Salbu, "Compressible Squeeze Films and Squeeze Bearings", Journal of Basic Engineering, Jun. 1964, pp. 355-364, ASME.
Ferdinand Hendriks, "Squeeze Bearing Levitated Sliders for Magnetic Storage", Tribology and Mechanics of Magnetic Storage Systems, 1987, 9 pp., vol. IV, SP-22, STLE, Park Ridge, IL.

(Continued)

*Primary Examiner* — Jefferson Evans
(74) *Attorney, Agent, or Firm* — John D. Henkhaus

(57) ABSTRACT

Approaches to use of a squeeze air bearing for supporting and/or rotating the disks in a hard-disk drive. The squeeze bearing, whose effect is based on relative normal motion between two surfaces, is arranged adjacent to the rim of the disk to provide a bearing force at the disk rim. The squeeze bearing comprises multiple cantilevered arms with one end fixed to a support ring assembly and the other end having one or more vibrational element which, when vibrating, provides the bearing force. At least one of the vibrational elements is configured at an angle to the disk rim and which, when vibrating, provides a tangential force to rotate the disk for HDD operational purposes. Therefore, such a squeeze bearing provides an integrated solution for bearing and rotating the disk(s) of an HDD, thereby eliminating the need for a liquid-based disk spindle motor system.

9 Claims, 5 Drawing Sheets

(56) References Cited

OTHER PUBLICATIONS

G. H. Jang, "Development of an HDD Spindle Motor With Increased Stiffness and Damping Coefficients by Utilizing a Stationary Permanent Magnet", IEEE Transactions on Magnetics, Jun. 2007, pp. 2570-2572, vol. 43 Issue 6.

K. Matsuoka et al., "New type motor for tough hard disk drive", Microsystem Technologies, Apr. 2007, 1193-1200, vol. 13 Issue 8.

Jihoon Lee et al., "Robust optimal design of the FDBs in a HDD to reduce NRRO and RRO", Microsystem Technologies, Sep. 1, 2012, pp. 1335-1342, vol. 18 Issue 9-10, Springer Verlag.

Chao Wang, "Levitation characteristics of a squeeze-film air journal bearing at its normal modes", Int J Adv Manuf Technol, Sep. 8, 2011, pp. 1-10, vol. 60, Springer-Verlag London Limited.

* cited by examiner

HARD DISK HAVING A SQUEEZE AIR BEARING FOR ROTATING A DISK

FIELD OF THE INVENTION

Embodiments of the invention relate to an ultrathin disk motor and integral bearing, for use in a hard disk drive (HDD).

BACKGROUND

A hard-disk drive (HDD) is a non-volatile storage device that is housed in a protective enclosure and stores digitally encoded data on one or more circular disks having magnetic surfaces. Historically, when an HDD is in operation, each magnetic-recording disk is rapidly rotated by a spindle motor system. Data is read from and written to a magnetic-recording disk using a read/write head transducer (also referred to as a "read/write head" or simply "head") which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. Suspensions have a spring-like quality which biases or urges the air bearing surface (ABS) of the slider against the disk to enable the creation of the air bearing film between the slider and disk surface. An actuator relies in part on the suspension's force on the slider and on the aerodynamic characteristics of the slider ABS to provide the proper distance between the read/write head and the surface of the magnetic-recording disk (the "flying height") while the magnetic-recording disk rotates. A slider therefore is said to "fly" over the surface of the magnetic-recording disk.

As noted, historically HDDs included a spindle motor system, with fluid dynamic bearings (FDB) being a common and important component of such systems. However, use of FDBs within HDDs presents some challenges. For example, FDBs typically provide too little tilt stiffness because the journal bearing span is constrained by the overall HDD thickness, with 5 mm (thick) HDDs being the current trend toward thinner and thinner drives. Current approaches to gaining more tilt stiffness in FDB designs include variations of the FDB groove parameters, such as the depth, land-groove ratio, and clearance. However, what is really needed for FDB designs is FDB axial bearing span, which is becoming more and more at odds with the trend toward thinner HDDs. Additionally, other common problems with the use of FDBs in HDDs include oil loss through evaporation and atomization, oil contamination, cavitation, temperature-sensitive torque, and shock sensitivity (e.g., splashing).

SUMMARY OF EMBODIMENTS OF THE INVENTION

Embodiments of the invention are directed at an ultrathin motor and integral bearing for supporting and/or rotating the disks in a hard-disk drive (HDD). In particular, a squeeze (i.e., air) bearing supports and drives the disk at the rim instead of the hub, providing for increased tilt stiffness.

In embodiments, the squeeze bearing, whose effect is based on relative normal motion between two bodies, is arranged adjacent to the rim of the disk it is affecting to provide a bearing normal force, and/or a propulsive force, at the disk rim. The squeeze bearing comprises multiple cantilevered arms with one end fixed to a support ring assembly and the other end (the "pad") having one or more vibrational element which, when vibrating, provides the bearing force, otherwise known as lift. In one embodiment, each vibrational element comprises one or more piezoelectric (PZT) elements.

In embodiments, at least one of the vibrational elements corresponding to a pad is configured at an angle to the disk rim, generally in the plane of the disk. Thus, each angled vibrational element, when vibrating, provides a tangential propulsive force, otherwise known as thrust, to the disk rim. This tangential force can be utilized to rotate, or spin, the disk for HDD operational purposes. Therefore, such a squeeze bearing can provide an integrated solution for bearing and rotating the disk(s) of an HDD, thereby eliminating the need for a centrally located disk spindle motor system.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to an ultrathin motor and integral bearing for supporting and/or rotating the disks in a hard-disk drive (HDD) are described. In particular, a squeeze air bearing supports and drives the disk at the rim instead of the hub, providing for increased tilt stiffness and eliminating the need for a disk spindle motor system.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
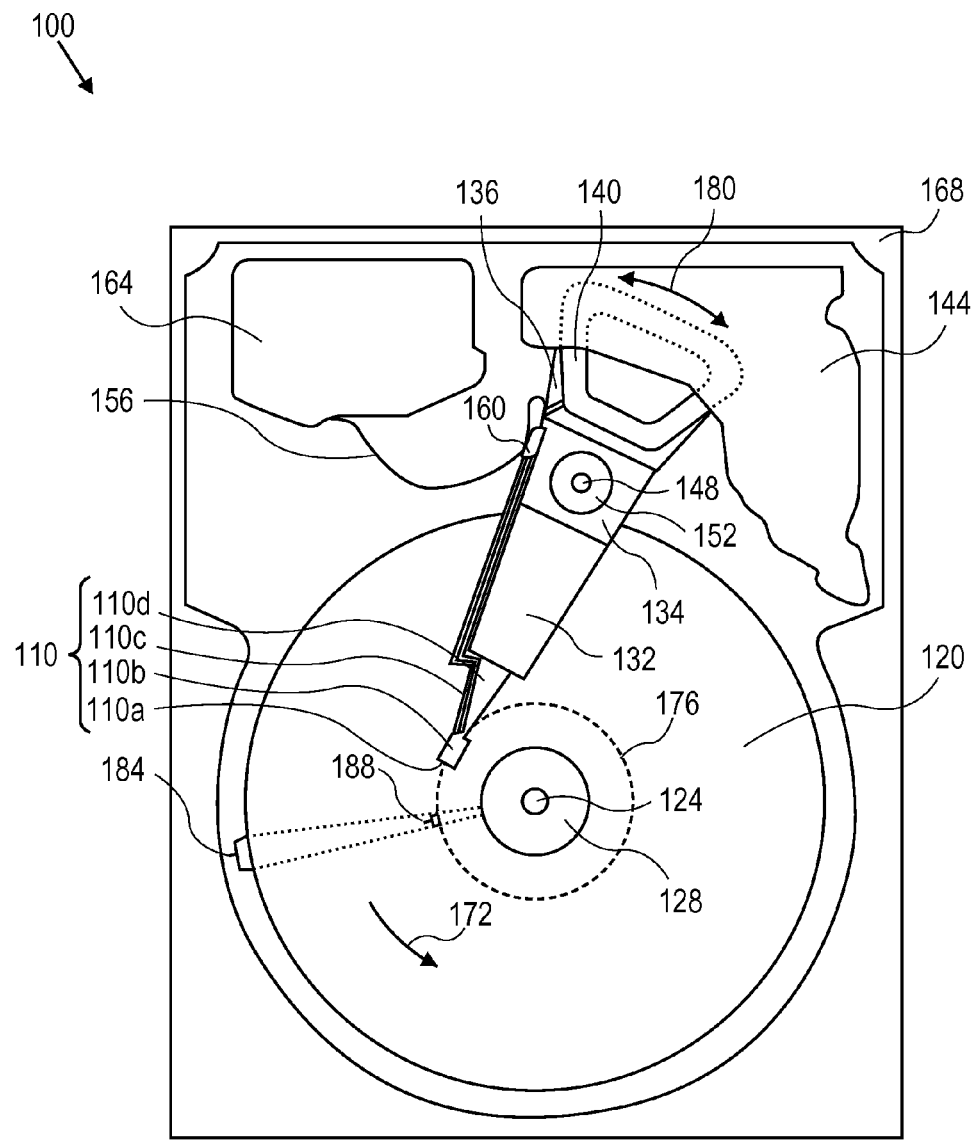
FIG. 1 is a plan view of a prior art hard disk drive (HDD)

FIG. 1 is a plan view of a prior art HDD. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a load beam 110d attached to the lead suspension 110c, all supporting the slider 110b which includes the head 110a at a distal end of the slider 110b. The slider 110b is attached at the distal end of the load beam 110d to a gimbal portion of the load beam 110d. The HDD 100 also includes at least one magnetic-recording disk 120 rotatably mounted on a spindle 124 and a drive motor attached to the spindle 124 for rotating the disk 120.

The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, electrical signals, for example, current to the voice coil 140 of the VCM, write signal to and read signal from the head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 acts as one of the surfaces of a self-acting air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184.

Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

A Hard-Disk Drive Having a Disk Squeeze Bearing

Figure 2:
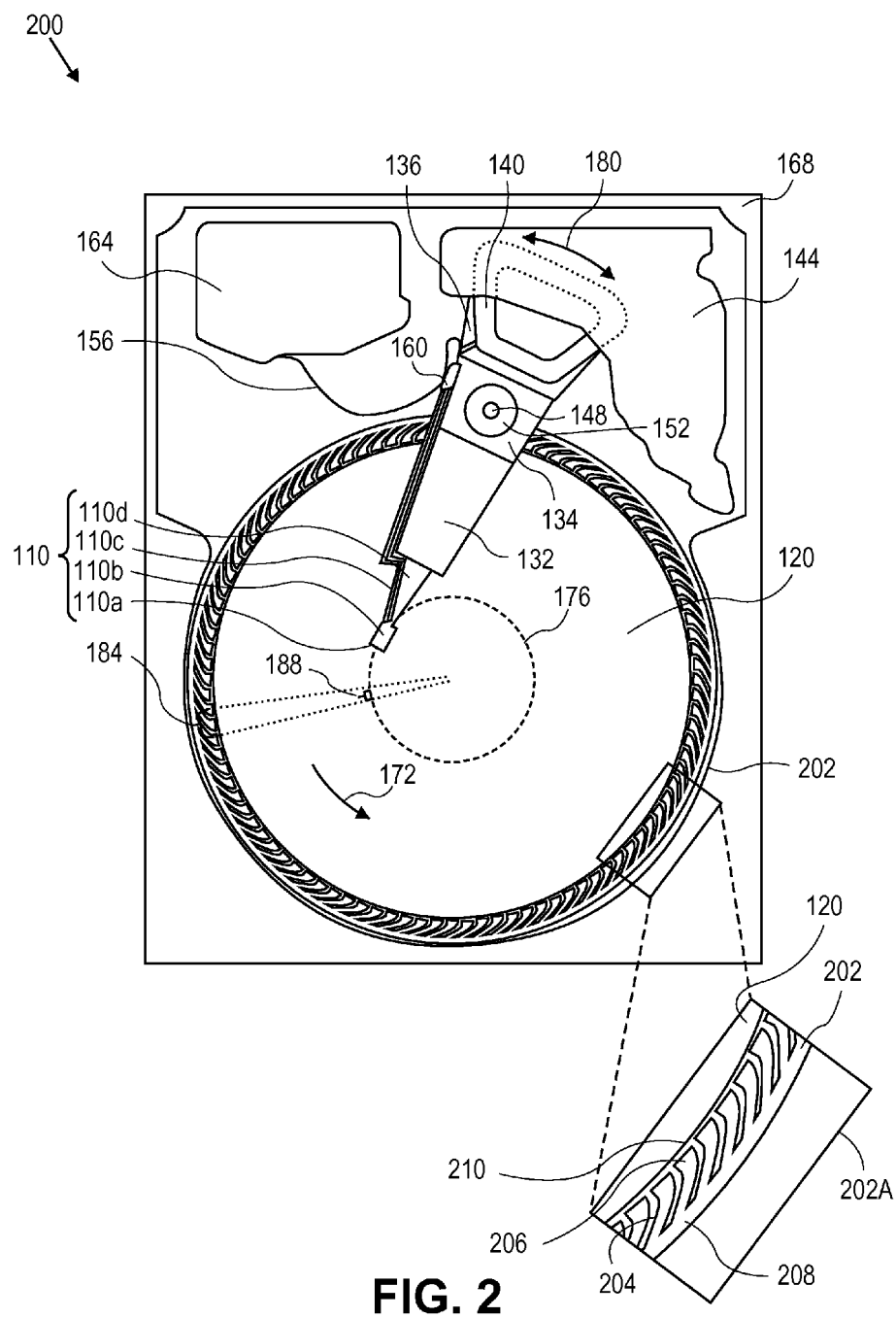
FIG. 2 is a plan view of a squeeze air bearing for use in an HDD, including a blowup view of a portion of the bearing, according to an embodiment of the invention.

Embodiments of the invention apply a squeeze air bearing (or simply "squeeze bearing") for use as a motor and/or integral bearing for the disk(s) in a hard-disk drive (HDD). FIG. 2 is a plan view of an HDD according to an embodiment of the invention. Most of the components of HDD 200 are the same or similar to the components of HDD 100 (FIG. 1), so these components are depicted similarly in both FIG. 1 and FIG. 2. Further, the same or similar components are not described again in reference to FIG. 2. Rather, reference is made to FIG. 1 for the descriptions of these same or similar components.

There is one significant difference between the configuration of HDD 100 (FIG. 1) and HDD 200. By contrast, HDD 200 includes a squeeze bearing 202 for supporting and/or rotatably driving the at least one magnetic-recording disk 120.

According to one embodiment, the squeeze bearing 202 is utilized to support the magnetic-recording disk 120 instead of the spindle 124 supporting the disk 120. In this embodiment, squeeze bearing 202 may augment the disk bearing function provided by spindle 124 and, therefore, coexist with spindle 124 in HDD 200. Alternatively, squeeze bearing 202 may be utilized to solely provide the disk bearing function, thereby eliminating the need for the spindle 124 for the bearing function and eliminating the need for a disk clamp 128 for clamping the disk(s) onto the spindle.

According to one embodiment, the squeeze bearing 202 is utilized to drive the rotation of, or spin, magnetic-recording disk 120 instead of the drive motor associated with spindle 124. Therefore, squeeze bearing 202 may be configured to provide both the disk bearing function (i.e., also referred to as levitation, or lift) and the disk driving function (i.e., also referred to as tangential force, or thrust), thereby eliminating the need for the spindle 124 altogether. According to one embodiment, the thrust force is applied to a relatively small diameter disk, such as a 3 cm diameter disk.

FIG. 2 includes an exploded view 202a of a portion of squeeze bearing 202, in relation to the rim or edge of disk 120. Squeeze bearing 202 comprises multiple arms 204 coupled to a support ring 208. Each of the arms 204 has a corresponding pad 206 which may be, or may house, a vibrational element 210. According to an embodiment, each vibrational element 210 of squeeze bearing 202 comprises one or more piezoelectric element.

Squeeze Bearing

Embodiments of the invention relate to the use of a squeeze bearing in an HDD to support and/or drive the rotation of the one or more disks. Squeeze bearings are a type of gas bearing which, in this instance, utilize the gas (usually air) within an HDD for the operational effect of the bearing. A squeeze bearing generates a pressure based on the squeeze film effect of a squeeze motion, i.e., the compressible film characteristics caused by oscillating relative normal motion between surfaces. The squeeze film effect and attempts at practical applications thereof has been studied for quite some time. For example, E. O. J. Salbu provided a basic account of the principle of squeeze film bearing in published "Compressible Squeeze Films and Squeeze Bearings" (J. Basic Engineering, June 1964, Volume 86, Issue 2, 355-364); the subject matter of which is incorporated by reference for all purposes as if fully set forth herein. Additionally, the present inventor discusses an application of squeeze bearings to HDD sliders in published "Squeeze Bearing Levitated Sliders for Magnetic Storage" (Tribology and Mechanics of Magnetic Storage Systems, STLE, Park Ridge, Ill., Vol. IV, SP-22, (1987), pp. 26-32); the subject matter of which is incorporated by reference for all purposes as if fully set forth herein, and in which it is explained that squeeze bearings are based on thin gas layers that are cyclically compressed and expanded in an isothermal manner.

A Squeeze Bearing for Disk Levitation

Figure 3A:
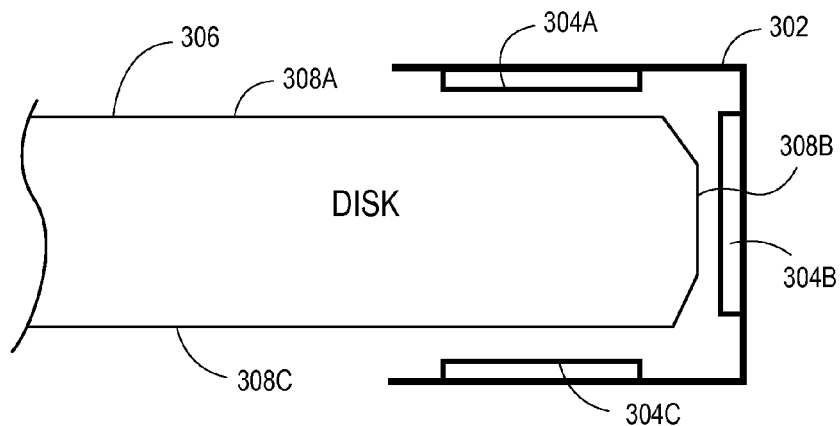
FIG. 3A is a diagram illustrating a first embodiment of a squeeze bearing vibrational element at a disk rim, according to an embodiment of the invention.
Figure 3B:
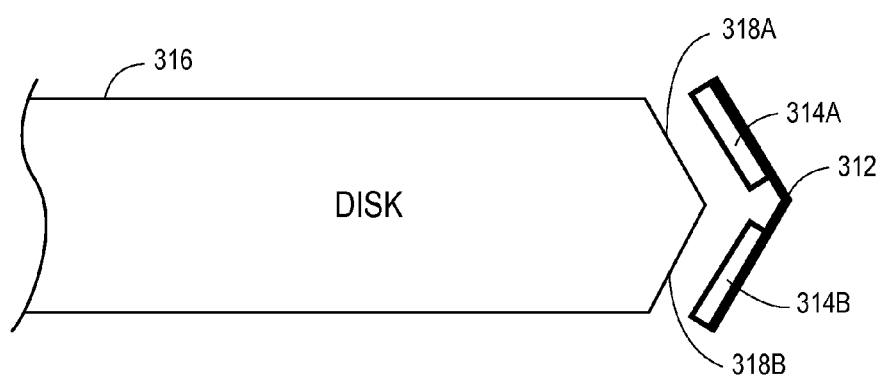
FIG. 3B is a diagram illustrating a second, alternative embodiment of a squeeze bearing vibrational element at a disk rim, according to an embodiment of the invention.

FIG. 3A is a diagram illustrating a first embodiment of a squeeze bearing vibrational element at a disk rim, according to an embodiment of the invention. FIG. 3B is a diagram illustrating a second, alternative embodiment of a squeeze bearing vibrational element at a disk rim, according to an embodiment of the invention. As the squeeze film effect of a squeeze bearing is a characteristic caused by relative normal motion between surfaces, each of FIGS. 3A and 3B illustrates how vibrational elements are arranged in relation to a corresponding disk, to provide radial and axial support to the disk.

FIG. 3A illustrates a vibrational element 302 (e.g., vibrational element 210 of FIG. 2) having a plurality of piezoelectric elements 304a, 304b, 304c arranged in close proximity to the rim of a disk 306. As discussed in reference to FIG. 2, each vibrational element 210 is configured on a pad 206 of an arm 204 of squeeze bearing 202 (the pad 206 and arm 204 are omitted from FIG. 3 for clarity purposes).

Returning to FIG. 3A, each of the piezoelectric elements 304a, 304b, 304c is substantially parallel to a corresponding surface of disk 306. That is, piezoelectric element 304a is substantially parallel to disk surface 308a, piezoelectric element 304b is substantially parallel to disk surface 308b, and piezoelectric element 304c is substantially parallel to disk surface 308c. Therefore, when the piezoelectric elements 304a, 304b, 304c are driven to vibrate they generate a force substantially normal to the corresponding disk surfaces, which generates the squeeze film effect of squeeze bearing 202 (FIG. 2).

FIG. 3B illustrates a vibrational element 312 (e.g., vibrational element 210 of FIG. 2) having a plurality of piezoelectric elements 314a, 314b arranged in close proximity to the rim of a disk 316. Again as with FIG. 3A, and as discussed in reference to FIG. 2, each vibrational element 210 is configured on a pad 206 of an arm 204 of squeeze bearing 202 (the pad 206 and arm 204 are omitted from FIG. 3 for clarity purposes).

Each of the piezoelectric elements 314a, 314b is substantially parallel to a corresponding surface of disk 316. That is, piezoelectric element 314a is substantially parallel to chamfered disk surface 318a and piezoelectric element 314b is substantially parallel to chamfered disk surface 318b. Therefore, when the piezoelectric elements 314a, 314b are driven to vibrate they generate a force substantially normal to the corresponding disk surfaces, which generates the squeeze film effect of squeeze bearing 202 (FIG. 2).

In both the configuration of FIG. 3A and the configuration of FIG. 3B, the pad 206 (FIG. 2) is configured so that when the disk velocity is zero, i.e., the disk is not rotating, the outer edge of the disk is mechanically supported by the pad 206. Stated otherwise, the outer edge of the disk rests lightly within the structure of each pad 206 when the disk is not rotating, effectively "clamping" the disk circumferentially. This disk support mechanism replaces the spindle and disk clamp mechanism typically found in prior HDD designs, thereby eliminating the problems typical of disk clamp designs, such as disk waviness due to non-uniform clamping forces. It is known that non-uniform clamping forces are a major source of repeatable run-out (RRO) in HDDs.

A Squeeze Bearing for Disk Thrust

Figure 4:
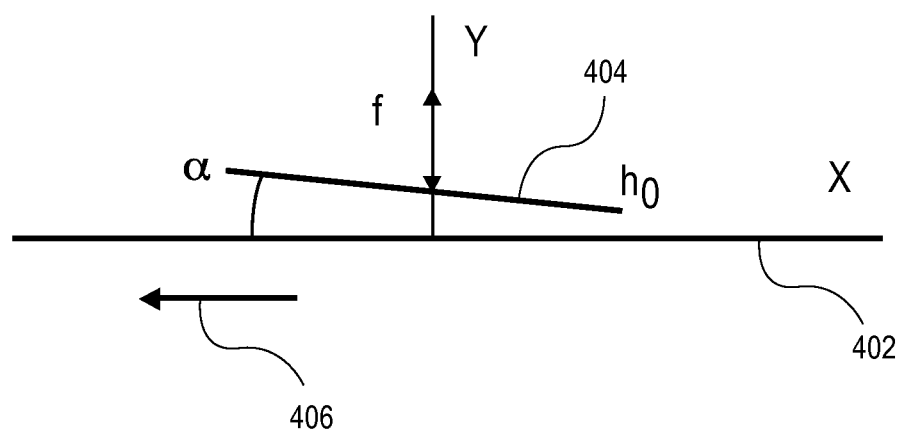
FIG. 4 is a diagram generally illustrating a concept of disk thrust using a tilted pad squeeze bearing as a disk actuator, according to an embodiment of the invention.

FIG. 4 is a diagram generally illustrating a concept of disk thrust using a tilted pad squeeze bearing as a disk actuator, according to an embodiment of the invention. The view depicted in FIG. 4 is akin to a plan view representing a portion of disk rim 402 ("unwrapped" into a planar surface) and a portion of a squeeze bearing pad 404, with the intention of describing the interaction therebetween.

As described, use of squeeze bearing for disk levitation purposes is based on relative normal motion between surfaces and FIGS. 3A and 3B were illustrated and described in this context. However, according to an embodiment, the pad 206 (FIG. 2) and thus the vibrational element 210 (FIG. 2) is tilted a bit (e.g., on the order of a few hundreds of micro-radians) in relation to the disk 120 (FIG. 2) rim and generally in the plane of the disk (i.e., the pad has a small pitch angle relative to the disk rim). Thus, the vibrational element 210 is not parallel with the disk 120 rim and, consequently, the interacting forces are not exactly normal. As a result, an additional thrust force is generated and applied to the disk 120 rim.

In reference to FIG. 4, the face of pad 404 is at an angle $\alpha$ to the face of disk rim 402, and at a minimum clearance height $h_0$. Vibration or oscillation of one or more vibrational element of pad 404 is shown as force f, up and down in the Y-direction. The squeeze film effect of the squeeze bearing is still in effect with the tilted squeeze bearing pad 404, and the angle of attack a of pad 404 relative to disk rim 402 enables production of a tangential force on the disk rim 402, thereby driving the disk to rotate in direction 406.

For a non-limiting example of the use of a squeeze bearing as a disk actuator, on a 3 cm diameter disk, approximately 47 vibrational elements could be arranged along the full perimeter of the disk. At a vibration frequency of 100 kHz and an amplitude of 4 microns, an average of 0.128 N/m tangential force (thrust) could be generated for each 2 mm pad. With the thrust per unit perimeter length of 0.128 N/m, the squeeze bearing exerts 0.12 W of power, which could rotate the disk at over 6.3 krpm.

A Method for Operating a Disk in a Hard Disk Drive

Figure 5:
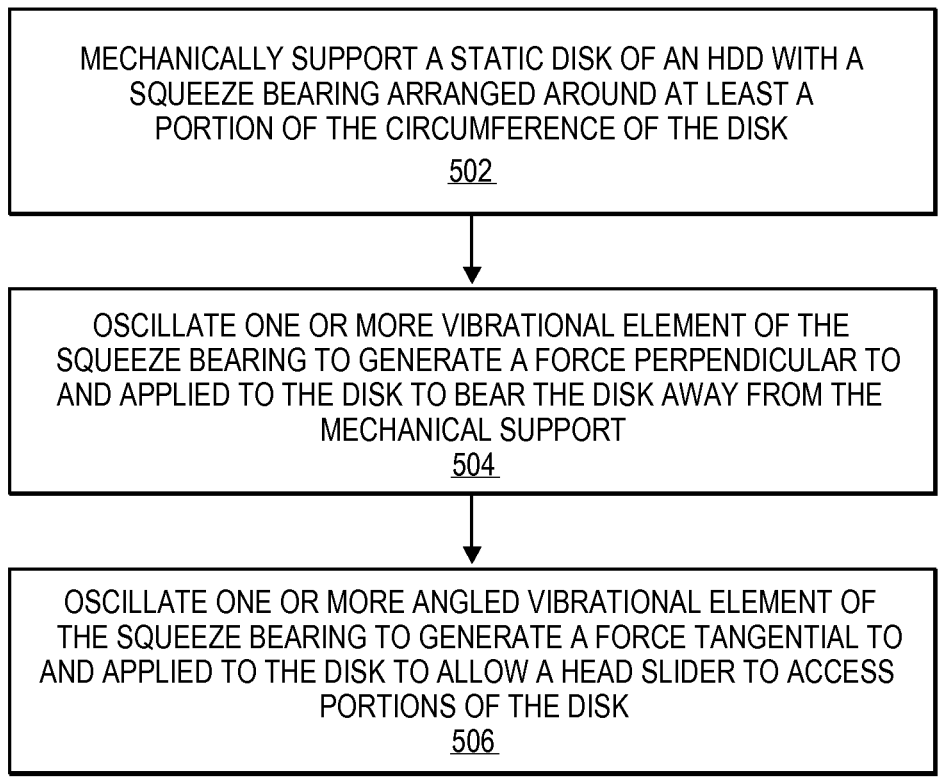
FIG. 5 is a flow diagram illustrating a method for operating a disk in a hard disk drive device, according to an embodiment of the invention.

FIG. 5 is a flow diagram illustrating a method for operating a disk in a hard disk drive device, according to an embodiment of the invention.

At block 502, a static disk of an HDD is mechanically supported with a squeeze bearing arranged around at least a portion of the circumference of said disk. For example, disk 120 (FIG. 2) of HDD 200 (FIG. 2) is supported by squeeze bearing 202 (FIG. 2) when the disk 120 is not rotating. For example, disk surface 308c (FIG. 3A) of disk 306 (FIG. 3A)

may be in contact with and thereby supported by piezoelectric element 304c (FIG. 3A) or, similarly, disk surface 318b (FIG. 3B) of disk 316 (FIG. 3B) may be in contact with and thereby supported by piezoelectric element 314b (FIG. 3B).

At block 504, one or more vibrational element of the squeeze bearing is oscillated to generate a force perpendicular to and applied to the disk to bear the disk away from the static mechanical support. For example, piezoelectric elements 304a, 304b, 304c (FIG. 3A) are electrically driven to oscillate, or vibrate, in a motion substantially normal to respective disk surfaces 308a, 308b, 308c (FIG. 3A) or, similarly, piezoelectric elements 314a, 314b (FIG. 3B) are electrically driven to oscillate, or vibrate, in a motion substantially normal to respective disk surfaces 318a and 318b (FIG. 3B). As explained elsewhere herein, these oscillations enable the squeeze-film effect which generates a bearing or levitating force to support the respective disk 306 (FIG. 3A) or 316 (FIG. 3B).

At block 506, one or more angled vibrational element of the squeeze bearing is oscillated to generate a force tangential to and applied to the disk to rotate the disk to allow a head slider to access portions of the disk. For example, piezoelectric elements 304a, 304b, 304c (FIG. 3A), if at a pitch angle to respective disk surfaces 308a, 308b, 308c (FIG. 3A), are electrically driven to oscillate, or vibrate, in a non-normal motion to respective disk surfaces 308a, 308b, 308c (FIG. 3A). For another example, piezoelectric elements 314a, 314b (FIG. 3B), if at a pitch angle to respective disk surfaces 318a and 318b (FIG. 3B), are electrically driven to oscillate, or vibrate, in a non-normal motion to respective disk surfaces 318a and 318b (FIG. 3B). As explained elsewhere herein, these oscillations enable the squeeze-film effect which generates a tangential or thrust force to rotatably move the respective disk 306 (FIG. 3A) or 316 (FIG. 3B), whereby the head slider (110a and 110b of FIG. 2) can access the disk to read from and/or write to the disk.

In addition to the purely up/down motion of the tilted squeeze bearing, the pitch angle of the squeeze bearing pad relative to the disk rim can also be varied during operation, i.e., while it is being oscillated. This type of motion of the squeeze bearing combines a heave and pitch motion (similar to a bird's wings when flying), which provides more thrust than with a constant pitch angle.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   a magnetic-recording disk;
   a head slider, housing a read/write head for writing data to and reading data from said disk;
   a voice coil motor configured to move the head slider to access portions of said disk; and
   a squeeze air bearing arranged adjacent to at least a portion of a rim of said disk and configured to provide a bearing force at said rim, said squeeze air bearing comprising:
      a plurality of cantilevered arms having a fixed end and a free end, and
      one or more vibrational element at said free end of said plurality of cantilevered arms which, when vibrating, provides said bearing force, and said one or more vibrational element configured at an angle to said disk rim and which, when vibrating, provides a tangential force at said rim that rotatably propels said disk.

2. The HDD of claim 1, wherein each of said one or more vibrational element comprises one or more piezoelectric element.

3. The HDD of claim 1, wherein said one or more vibrational element is configured to mechanically support said disk at said rim when rotational velocity of said disk is zero.

4. The HDD of claim 1, wherein said rim of said disk includes a chamfer.

5. A squeeze air bearing for a hard disk drive, comprising:
   a plurality of cantilevered arms having a fixed end and a free end;
   one or more vibrational element at said free end of said plurality of cantilevered arms which, when vibrating, provides a bearing force to a disk of said hard disk drive;
   wherein said squeeze air bearing is arranged adjacent to at least a portion of a rim of said disk to provide said bearing force at said rim; and
   wherein said one or more vibrational element is configured at an angle to said disk rim to provide a tangential force at said rim that rotatably propels said disk.

6. The squeeze air bearing of claim 5, wherein each of said one or more vibrational element comprises one or more piezoelectric element.

7. The squeeze air bearing of claim 5, wherein said one or more vibrational element is configured to mechanically support said disk at said rim when rotational velocity of said disk is zero.

8. A method for operating a disk in a hard disk drive, the method comprising:
   mechanically supporting a static disk, of said hard disk drive, with a squeeze bearing arranged around at least a portion of the circumference of said disk;
   oscillating one or more vibrational element of said squeeze bearing to generate a force perpendicular to and applied to said disk to bear the disk away from mechanical support; and
   oscillating said one or more vibrational element configured at a pitch angle to said disk rim to generate a force tangential to and applied to said disk to rotatably propel said disk to allow a head slider to access portions of said disk.

9. A hard-disk drive (HDD), comprising:
   a magnetic-recording disk;
   a head slider, housing a read/write head for writing data to and reading data from said disk;
   a voice coil motor configured to move the head slider to access portions of said disk; and
   a squeeze air bearing arranged adjacent to at least a portion of a rim of said disk and having vibrational elements configured at an angle to said rim to provide a thrust force at said rim that rotatably propels said disk.

* * * * *

UNITED STATES PATENT AND TRADEMARK OFFICE
CERTIFICATE OF CORRECTION

| | | |
|---|---|---|
| PATENT NO. | : 8,773,814 B1 | Page 1 of 1 |
| APPLICATION NO. | : 13/720778 | |
| DATED | : July 8, 2014 | |
| INVENTOR(S) | : Ferdinand Hendriks | |

It is certified that error appears in the above-identified patent and that said Letters Patent is hereby corrected as shown below:

On the title page, item (54) and in the specification, column 1, line 1, the Title should read: HARD DISK --DRIVE-- HAVING A SQUEEZE AIR BEARING FOR ROTATING A DISK Signed and Sealed this
Sixteenth Day of September, 2014

Michelle K. Lee
*Deputy Director of the United States Patent and Trademark Office*